United States Patent [19]
Bayer

[11] Patent Number: 5,613,929
[45] Date of Patent: Mar. 25, 1997

[54] MACHINE TOOL WITH BAR-SPINDLE AND DIN STANDARD TOOLHOLDER CHANGER

[75] Inventor: Jack L. Bayer, Phoenix, Ariz.

[73] Assignee: Hurco Companies, Inc., Indianapolis, Ind.

[21] Appl. No.: 478,898

[22] Filed: Jun. 7, 1995

[51] Int. Cl.⁶ .............................. B23Q 3/157; B23C 5/26; B23B 47/18
[52] U.S. Cl. .................... 483/1; 408/238; 409/233; 483/31
[58] Field of Search .................... 483/1, 27, 31, 483/32, 36, 55, 56, 57; 409/232, 233, 234; 408/238, 239 R

[56] References Cited

U.S. PATENT DOCUMENTS

| | | |
|---|---|---|
| 2,811,877 | 11/1957 | DeGroff . |
| 3,139,637 | 7/1964 | Minkenberg . |
| 3,191,260 | 6/1965 | Jorgensen ................................ 483/56 |
| 3,797,956 | 3/1974 | Bayer et al. ............................ 408/35 |
| 3,893,371 | 7/1975 | Frazier ................................ 409/233 X |
| 3,999,769 | 12/1976 | Bayer et al. ............................ 408/238 |
| 4,008,646 | 2/1977 | Hague et al. ........................ 408/239 R |
| 4,008,647 | 2/1977 | Hague et al. . |
| 4,419,797 | 12/1983 | Sigcoch et al. ...................... 483/56 X |
| 4,443,929 | 4/1984 | Bayer et al. . |
| 4,480,366 | 11/1984 | Takahashi et al. . |
| 4,640,653 | 2/1987 | Schartzman .......................... 409/233 |
| 4,688,970 | 8/1987 | Eckman . |
| 4,748,357 | 5/1988 | Kempken ............................ 409/233 |
| 4,827,600 | 5/1989 | Miyano ............................ 483/57 X |
| 4,842,457 | 6/1989 | Badagnani . |
| 4,957,398 | 9/1990 | Schneider et al. .................... 409/233 |
| 5,020,968 | 6/1991 | Yamada et al. ...................... 409/231 |
| 5,078,558 | 1/1992 | Arai et al. ............................ 409/233 |
| 5,242,360 | 9/1993 | Bayer ................................. 483/36 |

FOREIGN PATENT DOCUMENTS

| | | |
|---|---|---|
| 2177211 | 11/1973 | France . |
| 358340 | 9/1922 | Germany . |
| 71777 | 6/1977 | Japan ................................. 483/56 |

*Primary Examiner*—William R. Briggs
*Attorney, Agent, or Firm*—Woodard, Emhardt, Naughton Moriarty & McNett

[57] ABSTRACT

In a vertical machining center, a spindle-drive sleeve is axially immovable in the machine frame, but rotates about its longitudinal axis to rotate a spindle mounted in the sleeve for rotation by the sleeve while axially slidable independent of the sleeve. A linear drive, non-rotating ball screw connected to the upper end of the spindle is driven axially by a rotationally powered, axially anchored ball nut to advance and retract the spindle in the sleeve. A drawbar coupling system extends inside the spindle from the top to the bottom to connect to any one of various toolholders in an index disk which is rotatable for positioning toolholders sequentially in line with the spindle axis. A pneumatically actuated drawbar operator shaft extends inside and coaxially with the ball screw from the top to the bottom. The shaft actuator is mounted to the top of the ball screw and drives the shaft axially inside the screw when a toolholder is to be approached for connection. Axial movement of the spindle by rotation of the ball nut in one rotational direction places the spindle in position for coupling to a toolholder in the index disk. Deactivation of the actuator enables a spring to secure a set of gripping fingers in the spindle onto the toolholder.

36 Claims, 9 Drawing Sheets

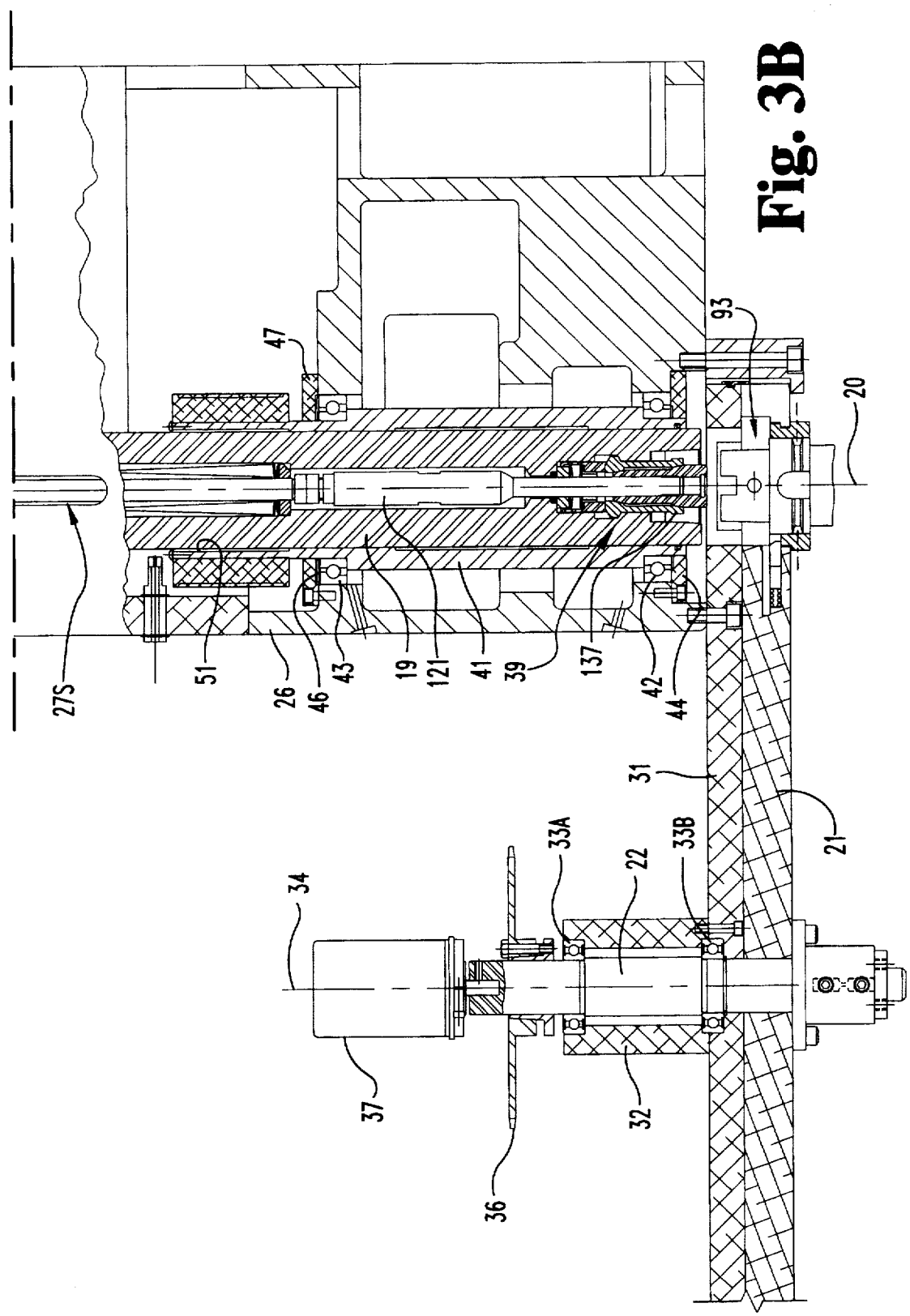

5,613,929

MACHINE TOOL WITH BAR-SPINDLE AND DIN STANDARD TOOLHOLDER CHANGER

BACKGROUND OF THE INVENTION

1. Field of the Invention

This invention relates generally to machine tools, and more particularly to the spindle mount and drive and toolholder for a machine tool with automatic toolchanger.

2. Description of the Prior Art

The machine tool art is extensive. Vertical milling machines constitute a large component of the machine tool art. Typically they include a horizontally positionable table to hold tile workpiece, a tool (usually a cutter of some type) for treating tile workpiece, a powered rotating spindle for rotating the tool and vertically drivable by hand or power to advance the tool into the workpiece. More recent machines are controlled by computer and, due to their versatility, are commonly referred to as computer numerically controlled, or CNC, machining centers. They are usually equipped with some kind of automatic tool changing feature to enable the machine to make different types, sizes and contours of cuts, some of them including means for translating the workpiece mounting table or the spindle on horizontal axes automatically for contouring.

A machining center having such features is shown and described in U.S. Pat. No. 4,443,929 issued Apr. 24, 1984 to me and Walter Breitkopf. It uses an automatic tool changing feature as disclosed in more detail in U.S. Pat. No. 3,999,769 issued Dec. 28, 1976 to me and Walter Breitkopf, and which, for some features, refers to our earlier U.S. Pat. No. 3,797,956 issued Mar. 19, 1974. In that system, and referring to the reference numerals in tile earlier U.S. Pat. No. 3,999,769, toolholders 58 were removably mounted in retaining rings 48 mounted in a rotatable turret plate 44 which could be indexed to place the axis of any one of the toolholders in line with a coupling plug 36 at the bottom of the tool drive spindle 30. When the turret plate was rotated to place the desired toolholder directly under and in axial alignment with the spindle, the spindle was driven downward by the spindle mounting sleeve 24 in FIG. 2 of that patent for engagement of tile coupling plug 36 on the spindle with the toolholder. Further downward drive of the spindle drove the toolholder out of the turret plate and into position to engage the cutting tool therein (not shown) with the workpiece. The spindle drive motor was energized to rotate the spindle for the cutting operation, while the sleeve 24 did not rotate. The purpose of the sleeve was to contain and rotatably support the spindle and drive the spindle up and down in the housing 22. When the machining with the cutter in that toolholder was complete, the spindle sleeve was retracted and, when the plug had been pulled up to the position shown in FIG. 2, the toolholder was released into and secured in the retaining ring 48 in the turret disk. Then the turret plate 44 could be rotatably indexed to place the next desired toolholder in position under the spindle whereupon the spindle would be driven downward to connect it to the toolholder and drive the toolholder and associated tool out of the disk to engage the tool with the workpiece. The disclosures of the above-mentioned patents are incorporated herein by reference.

In machine tools, it is generally desirable to have a high degree of rigidity so that the surface which is treated (usually by cutting) on the workpiece is well within acceptable tolerance. Cutting forces transverse to the rotational axis of the tool tend to cause a bending moment from the cutter to the spindle support. The result is a certain amount of radial deflection of the spindle caused by the cutting forces. To improve rigidity of a spindle within dimensional constraints of a machine structure, and still avoid the necessity of the spindle housing bodily moving toward and away from the turret plate and the workpiece, an improved spindle mounting, rotating and driving combination was invented and is shown and described in U.S. Pat. No. 5,242,360 issued Sep. 7, 1993, the disclosure of which is incorporated herein by reference. But there is an effort by some people in the machine tool industry, particularly the German national standards institute (the DIN) to standardize on a hollow-shank, short-taper toolholder for use on machine tools worldwide. The toolholder is referred to as the DIN HSK standard toolholder. The present invention is addressed to achieving the benefits of the structure of the aforementioned U.S. Pat. No. 5,242,360 but accommodating the HSK standard toolholders.

SUMMARY OF THE INVENTION

Described briefly, according to a typical embodiment of the present invention, a machining center has a frame in which an elongated spindle drive sleeve is mounted for rotation about its longitudinal axis while confined to avoid axial movement. A spindle is slidably received in the sleeve for axial movement therein. A spindle drive motor is coupled to the sleeve to drive the sleeve and thereby the spindle, in rotation. A tubular linear drive screw is connected to one end of the spindle and is driven axially by a powered nut to advance and retract the spindle in tile sleeve. A spring-loaded drawbar assembly is located inside the spindle for coupling, one-at-a-time, to any one of many DIN toolholder-adaptor combinations mounted in a magazine. A drawbar actuator assembly is mounted atop the linear drive screw. The adaptors are secured in the magazine by a twist type locking system in one embodiment, and by retaining detent pins in another embodiment.

BRIEF DESCRIPTION OF THE DRAWINGS

FIG. 3B is a vertical sectional view of the lower portion of the spindle and sleeve and drawbar assembly and part of the tool disk drive but taken at the plane and viewed in the direction of the arrows 3—3 in FIG. 1.

FIG. 4 is an enlarged section of the lower portion the spindle showing the

FIG. 7 is sectioned.

DESCRIPTION OF THE PREFERRED EMBODIMENT

Figure 1:
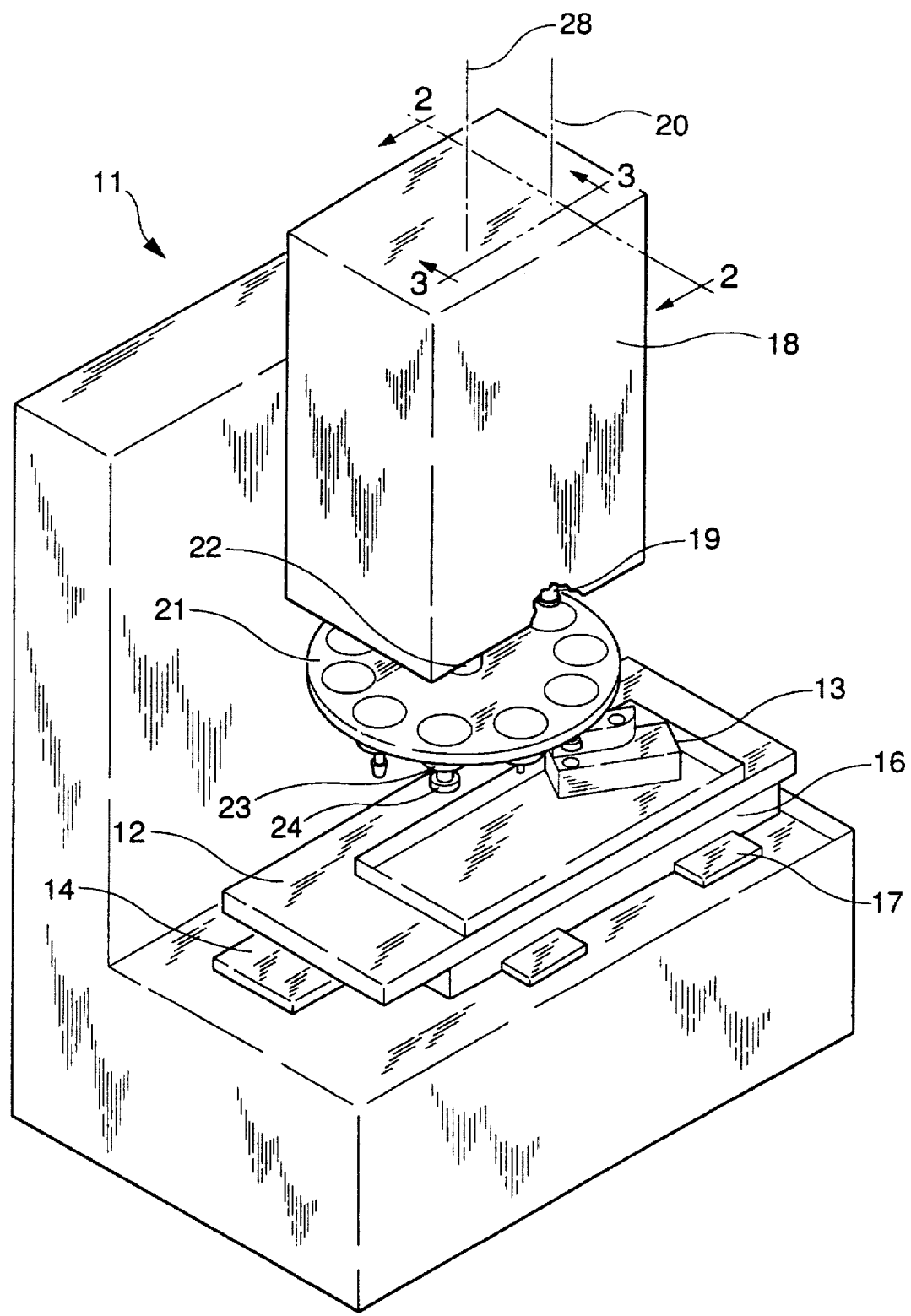
FIG. 1 is a very schematic pictorial view of a machining center incorporating tile present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, FIG. 1 shows in a very schematic way, a vertical machining center 11 having a table 12 on which the workpiece 13 is secured. The table is mounted for rectilinear translation on the ways 14 of carriage 16 for X-axis movement, with the carriage 16 mounted on ways 17 on the base for Y-axis movement.

A housing 18 is secured to the machine and encloses a spindle assembly constructed, mounted and operated in a manner according to the present invention and wherein the spindle 19 has a toolholder gripper at the lower end of the spindle and rotatable with the spindle on axis 20.

A toolholder carrier turret plate 21, hereinafter referred to as a tool disk, is secured to a shaft 22 rotatably mounted in the machine and has a plurality of circularly spaced apertures with retainers therein holding a plurality of toolholders such as 23, each toolholder holding a tool such as 24 for a particular type of machining operation to be performed by that tool on the workpiece 13. Rotary drive for the tool disk 21 is provided in the head 18 and is able to position any one of the toolholders under the spindle 19. A computer numerical controller (not shown) is coupled to the drive motors for the X-Y carriages and the tool disk to position the workpiece and toolholders according to a programmed sequence predetermined for the necessary operations on the workpiece 13. Such control and drive means are known in the art. Examples are Acroloc Models AD12-20, AD15-32 and AD15-40 CNC Vertical Machining Centers.

Figure 2A:
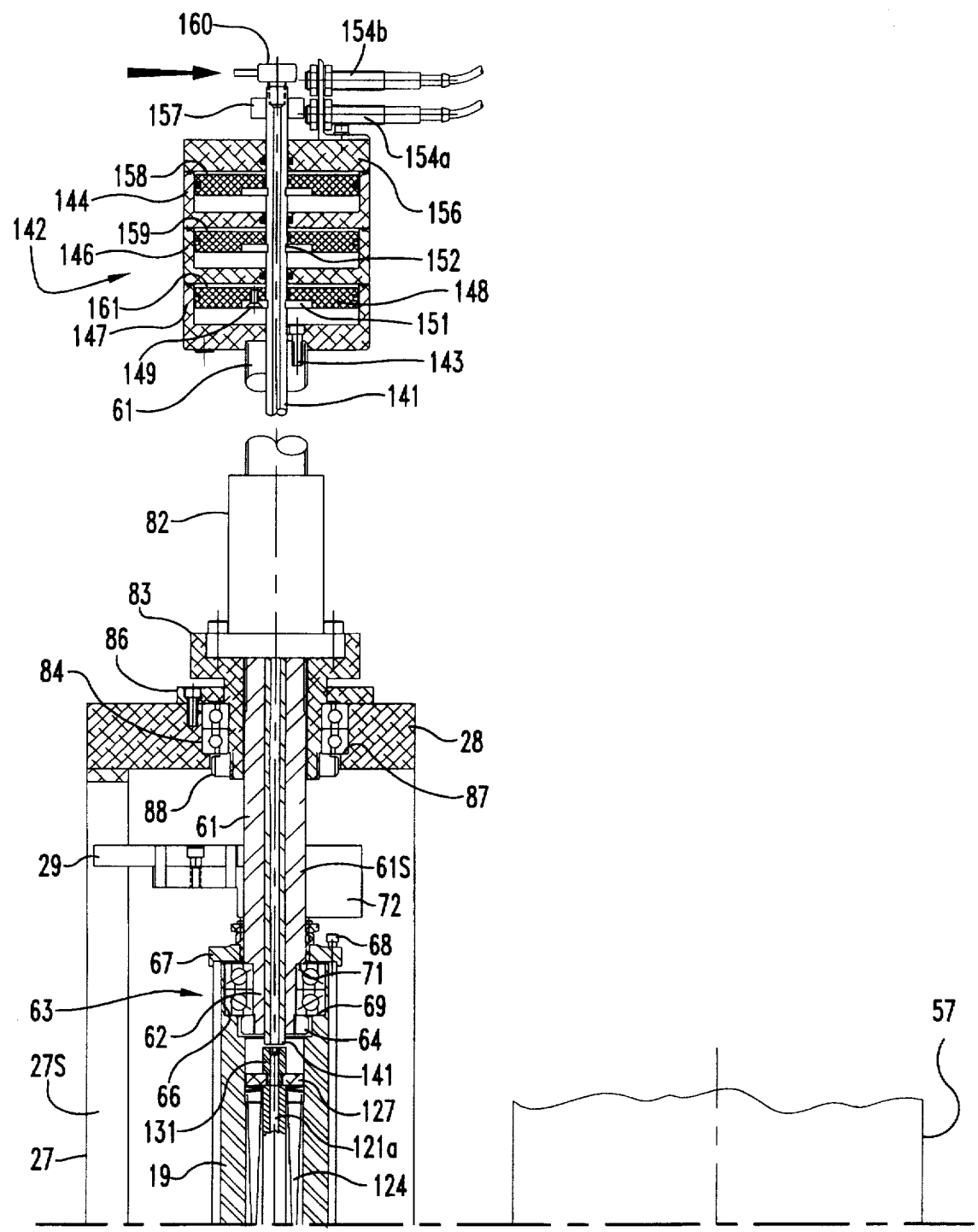
FIG. 2A is a vertical sectional view of the upper portion of the spindle and sleeve and drawbar operating assembly taken on a vertical plane 2—2 in FIG. 1 containing the rotational axis of the spindle assembly, and viewed in the direction of the arrows.
Figure 2B:
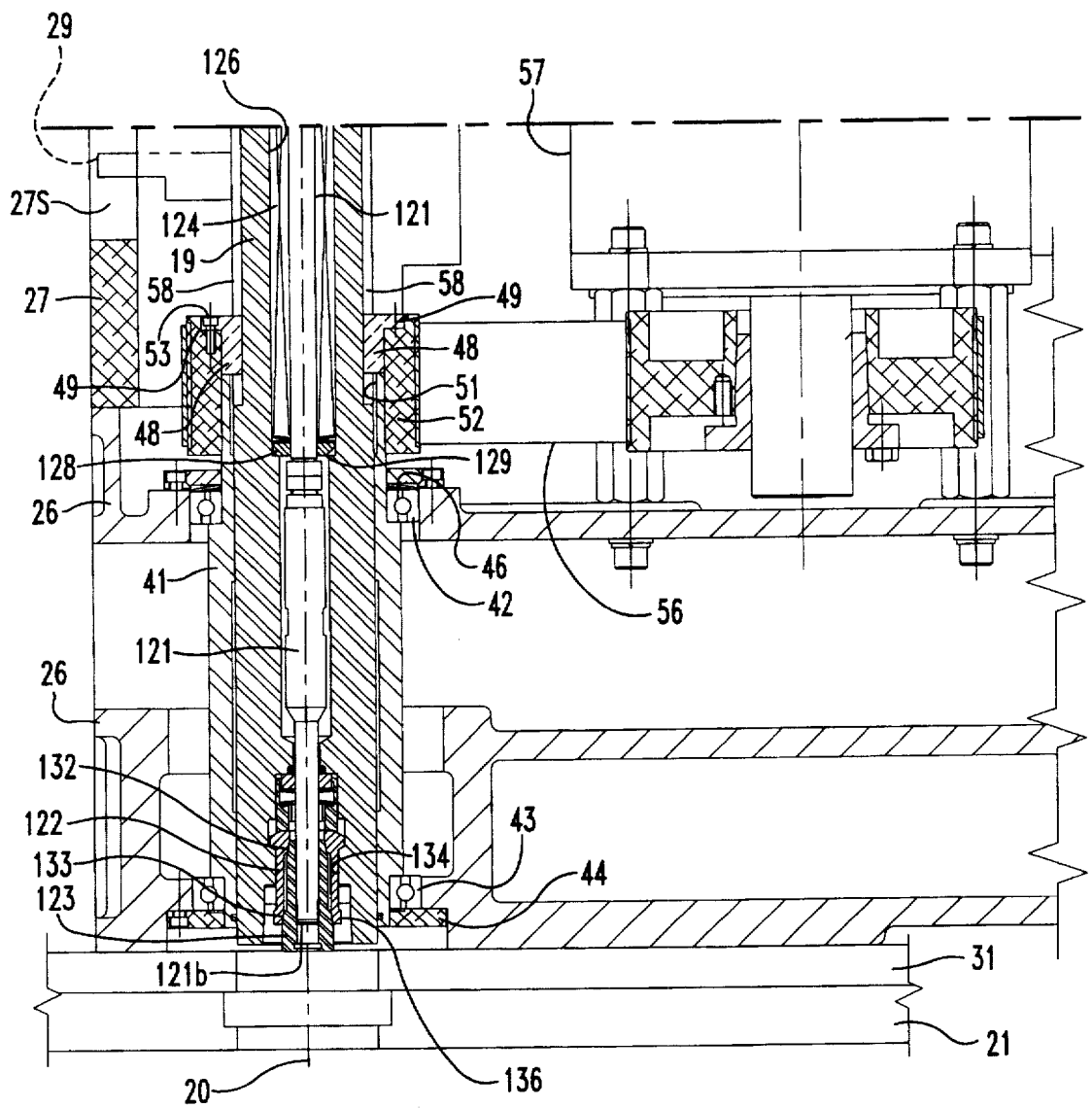
FIG. 2B is a vertical sectional view of the lower portion of the spindle and sleeve and drawbar assembly and taken on the same plane 2—2 in FIG. 1 containing the rotational axis.

Referring now to FIGS. 2A, 2B, 3A and 3B, there is shown a structure which is mounted inside the housing 18 of FIG. 1. It includes a frame comprising head casting 26 (FIG. 2B), bar drive housing 27 secured to the head casting, and ball nut drive motor mounting plate 28 (FIG. 2A) secured to housing 27. As shown in FIGS. 2A and 2B and partially in FIGS. 3A and 3B, there is a vertically extending slot 27S in housing 27 and which extends toward the top of housing 27 and which receives a ball screw anti-rotation bar 29 as described hereinafter.

Mounting for the tool disk includes support plate 31 fixed to the bottom of head 26 but not shown in FIG. 1, shaft retainer 32 fixed to plate 31, and upper and lower bearings 33A and 33B mounted in the shaft retainer and supporting the shaft 22 for rotation on the axis 34. Tool disk drive and indexing features are designated generally by drive sprocket 36 and tool disk encoder 37 but are of a type known in the art and not a part of this invention so not shown or described in further detail herein.

The tool drive spindle 19 has a conventional internal drawbar-type clamping mechanism 39 in it of a type known for use with HSK standard toolholders. For rigidity of the spindle and resistance to bending due to cutting forces, the spindle is mounted and controlled according to the invention of above-mentioned U.S. Pat. No. 5,242,360, by fitting it in elongate cylindrical sleeve 41 (FIGS. 2B and 3B) having lower and upper shoulders receiving the inner races of lower and upper ball bearing assemblies 42 and 43, respectively, whose outer races are slip fitted in the head 26 and held in place by spring force so that the sleeve 41, while freely rotatable about the spindle axis 20, cannot move axially. The lower spindle mounting bearing outer race is retained the head by clamp ring 44 secured to the frame by six socket head cap screws. The upper spindle mounting bearing outer race is spring forced down to pre-load the top and bottom bearings. For this purpose, a Belville spring 46 (FIG. 3B) is clamped in the head by the clamp ring 47 secured to the head by six circularly spaced socket head cap screws. The spring allows a small displacement between the top and bottom bearings to overcome the thermal expansion of the sleeve. The upper and lower spindle-mounting bearings are pre-loaded for zero axial and radial relative movement between the races. The spindle 19 itself is vertically slidable in the sleeve 41. Two L-shaped keys 48 having square cross section and outwardly projecting arms 49 are mounted in upwardly opening slots in the upper end of bore 51 of the sleeve 41 at diametrically opposite locations thereon. The arms 49 of these keys are received in pockets in the upper end of the spindle sleeve drive pulley 52 and retained there by socket head cap screws 53. The internal bore of pulley 52 is fittingly received on the outer cylindrical surface 54 of the sleeve. The pulley is driven by a poly V-belt 56 and which is driven by the spindle drive motor 57. The spindle drive keys 48 are received in vertically extending keyways 58 in the spindle whereby spindle is drivable in rotation regardless of its axial position in the sleeve.

Referring to FIG. 2A, the axial positioning drive of the spindle is achieved in much the same manner as in the above-mentioned U.S. Pat. No. 5,242,360. It includes ball screw 61 having a stem 62 at its lower end coupled by two stacked ball bearing assemblies 63 to tile upper end of the spindle 19. The inner races of the bearings are slip fitted onto the stem 62 and clamped against the ball screw shoulder by locknut 64 screwed onto the threaded lower end of stem 62. The outer races are slip fitted into the cylindrical pocket 66 in the upper end of the spindle and clamped in place by spindle cap ring 67 fastened to the top of the spindle 19 by six circularly spaced socket head cap screws 68. The sides of the inner bearing races are clamped against each other, and the outer race of the lower bearing abuts against the shoulder 69 in the spindle, and the inner race of the upper bearing abuts against the shoulder 71 of the ball screw, and the bearings are pre-loaded ball bearings so that there is no relative axial or radial movement between the ball screw 61 and the spindle 38.

The ball bearing connection between the ball screw and the spindle enables free rotation of the spindle with respect to the ball screw 61. Rotation of the ball screw prevented by an anti-rotation system which includes anti-rotation bar 29 (shown at upper end of travel in FIG. 2A and shown dotted at lower end of travel in FIG. 2B) fastened to anti-rotation housing 72 which has a vertical aperture sized for a slip fit onto the smooth surface 61S (FIG. 2) of ball screw 61. The housing is split on a radius at 73 (FIG. 3A) and is clamped to the ball screw by a socket-head cap screw 74 extending across the split. The anti-rotation housing 72 is also fixed, to the ball screw by dowel pin 76. The anti-rotation bar 29 is prevented from rotation in the bar housing 27 by confinement of the outboard bar portion between the vertical sides of the vertically extending slot 27S in the bar housing 27. In this way, the ball screw can move vertically but without rotation while the spindle rotates. The rotational position of the spindle is indicated by rotary encoder 77 mounted through a bracket to the anti-rotation housing 72. The encoder pulley is coupled through a timing gear belt 78 to spindle gear pulley 79 secured by screws through flange 81 to spindle cap ring 67.

Figure 3A:
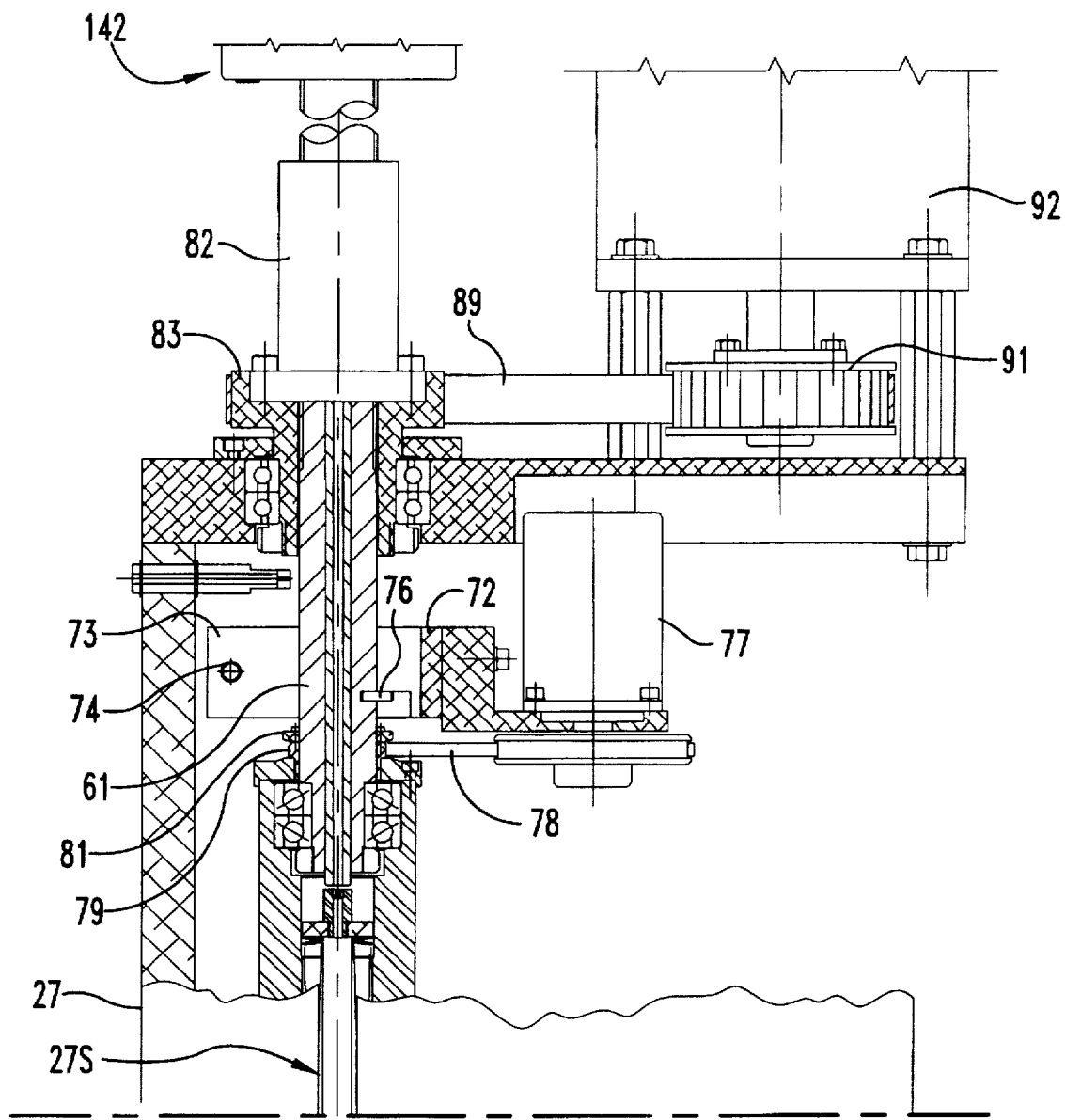
FIG. 3A is a vertical sectional view of the upper portion of the spindle and sleeve and drawbar operating assembly (shown fragmentarily) but taken at the plane and viewed in the direction of the arrows 3—3 in FIG. 1.

Vertical drive for the ball screw is provided by the ball nut assembly 82 which is mounted to ball nut drive pulley 83 which is mounted by two ball bearing assemblies 84 in plate 28 in a manner similar to the mounting of the ball screw to the spindle. The outer races of the bearing assemblies 84 are slip fitted into the plate 28 and clamped in place by ring 86 fastened to plate 28 by six circularly spaced cap screws. The outer race of the lower bearing assembly is abuttingly engaged with the upwardly facing shoulder 87 in plate 28. The inner races are slip fitted to the ball nut pulley. The inner race of the upper bearing assembly abuts the downwardly facing shoulder on the ball nut pulley. The inner race of the lower bearing assembly is clamped against the inner race of the upper bearing assembly by the nut 88 screwed onto the threaded lower end of the ball nut pulley 83. Because the ball bearing assemblies 84 are pre-loaded, there is no axial or radial movement of the ball nut assembly relative Lo the plate 28. Referring to FIG. 3A, ball nut pulley 83 receives the timing belt 89 driven by pulley 91 of the servo motor 92 mounted to plate 28, to drive the spindle downward (advance direction) during rotation of the motor in one direction, and drive the spindle upward (retract direction), during drive of the motor in the opposite rotational direction.

Figure 5:
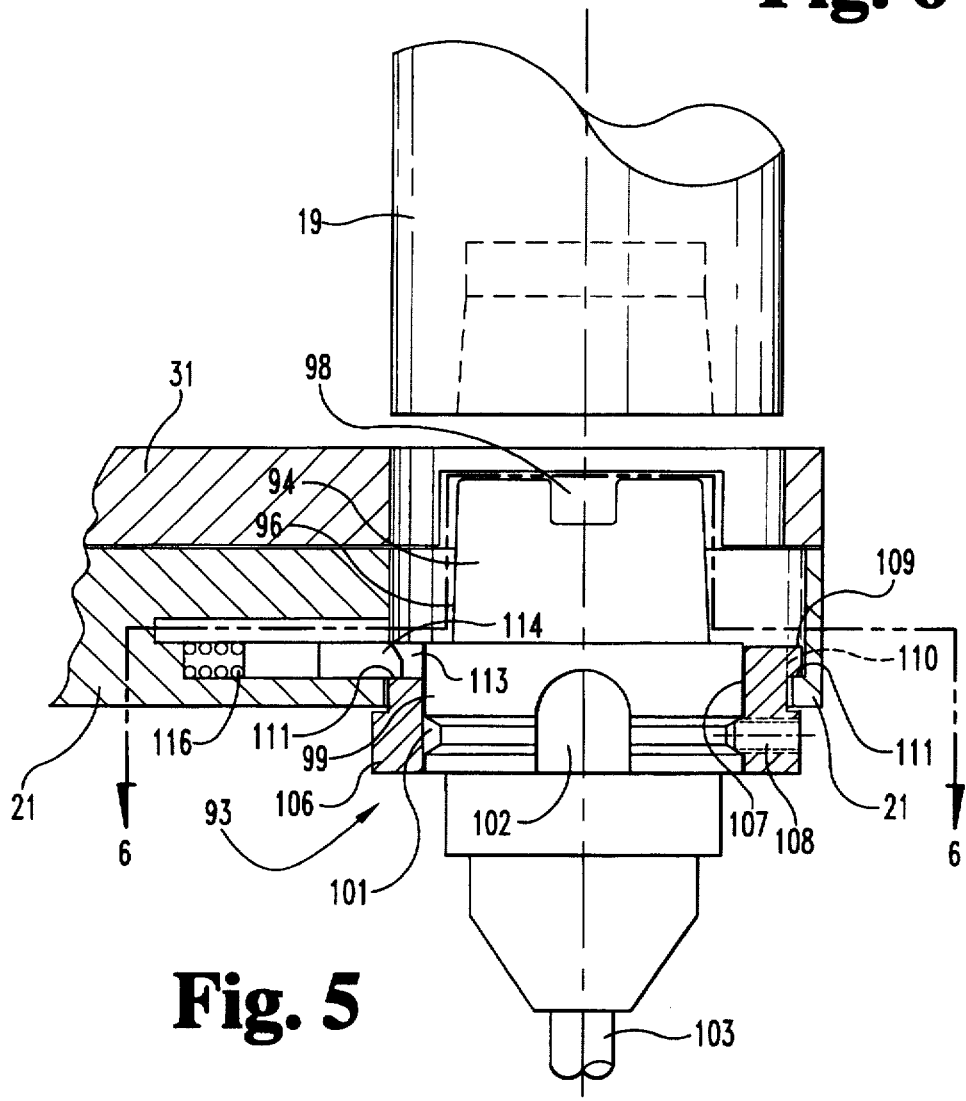
FIG. 5 is an enlarged view of a toolholder and adaptor in tile tool disk (shown fragmentarily and partially in section) at position aligned with the spindle for connection to the spindle.

As suggested above, the toolholder is conventional in nature and, although several different styles of the HSK standard have been developed, an example of the hollow-shank, short-taper toolholder is shown at 93 in FIGS. 3B and 5. The shank portion 94 thereof is tapered at surface 96, has a central aperture 97 and a pair of diametrically opposed upwardly opening notches 98 in the top to receive and mate with drive lugs (not shown) in the spindle. The flange 99 has circumferential groove 101 and a pair of diametrically opposed flat pad surfaces 102 therein. A machining tool 103 of any suitable nature is gripped therein and extends vertically downward therefrom. The tool disk may hold as many as twenty-two of these toolholders with an assortment of tools mounted therein. Mounting of these toolholders to the disk according to one feature of one embodiment of the present invention is accomplished by the use of adaptor 106. This adaptor has a central aperture 107 fittingly receiving the shoulder portion 99 of the toolholder. There are three circularly-spaced set screws 108 (only one being shown in the drawing) which are threaded through the adaptor and into the groove 101 of the toolholder and secure the toolholder in the adaptor. The adaptor has three circularly spaced lugs 109 projecting out from the cylindrical outer wall 110 of the adaptor and normally received on and supported by three circularly spaced shelves 111 at each of the twenty-two openings in the turret tool disk. One of the lugs has a notch 113 therein receiving a spring loaded detent pin 114, one of which is located in the tool disk at each of the openings and is urged inwardly into the notch by a spring 116 seated in the tool disk 21.

There is a slot 117 in each of the tool disk openings adjacent each of the shelves 111. The slots are identical and each is large enough to permit the lugs 109 to pass through the slots 117 widen the adaptor is turned on its axis through a sixteen degree arc from the shelf stored position. Therefore, if the adaptor 106 is turned through an arc of sixteen degrees from the position shown by the solid line in FIG. 6, to a position where each of the three lugs 109 is in registry with a slot 117, the adaptor can fall out of the tool disk. The detent pin 114 normally keeps the adaptor in the correct rotational position for storage so as to keep the lugs 109 securely resting in shelved position on the shelves 111.

Figure 4:
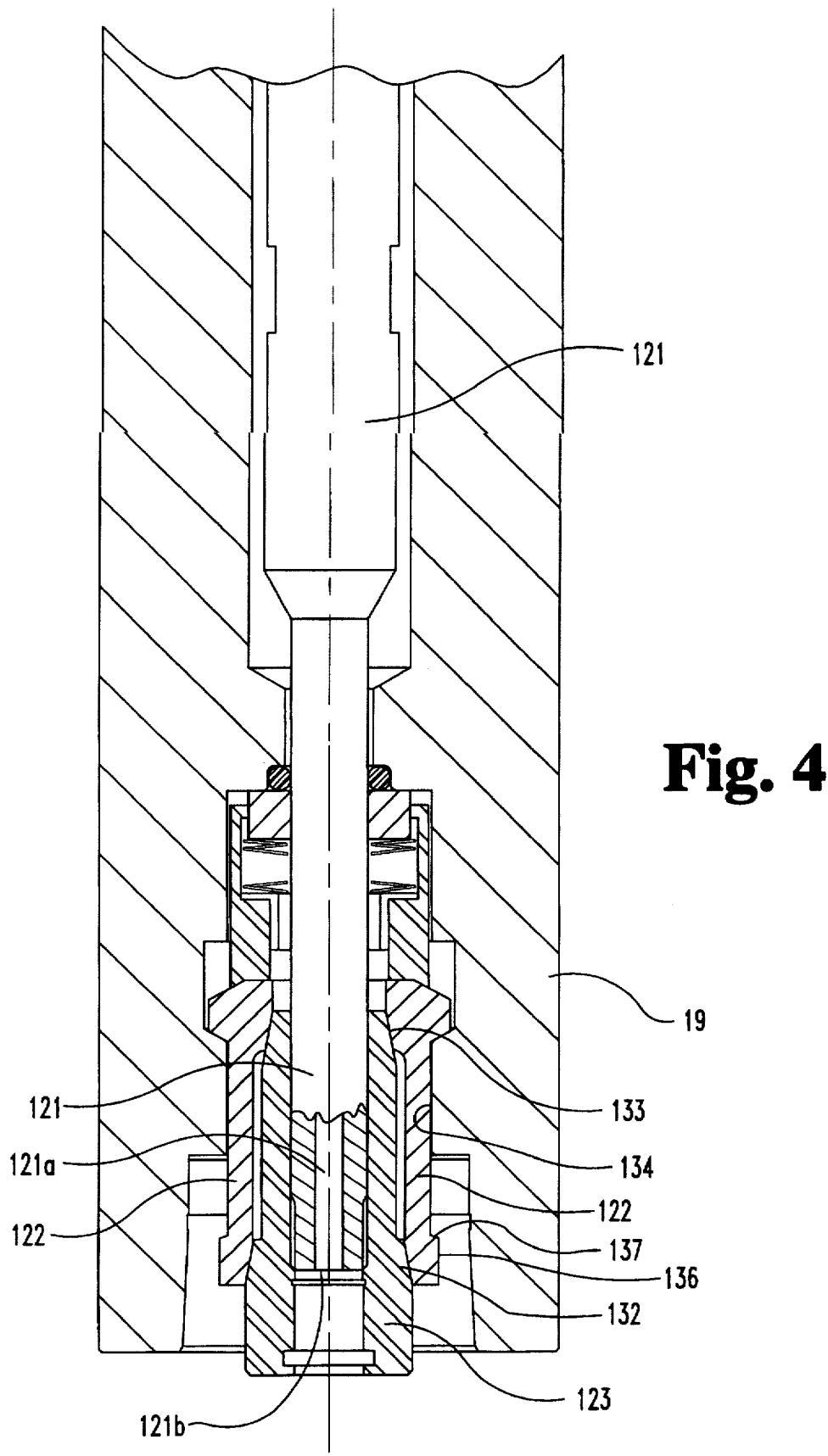

To enable the spindle assembly of the present invention to clamp and unclamp and manage the toolholders and associated tools for the work to be performed, the clamping assembly 39 is incorporated in the center of the spindle and extends throughout most of the length of the spindle. Since some portions of the clamping assembly are conventional, it will be described only generally herein. It includes the drawbar 121 having a set of expanding collet jaws 122 with a collet-operating cam plug 123 fastened to the lower end of the drawbar. The drawbar has a central lumen 121 a (FIGS. 2A and 4) throughout its length. A stack of Belville spring washers 124 is centered on the drawbar inside the spindle bore 126. A guide piston 127 (FIG. 2A) is at the upper end of the stack and serves as an upper spring seat and drawbar guide. A spring seat disk 128 (FIG. 2B) is at the lower end of tile stack and rests upon the shoulder 129 of the spindle. Piston 127 may be screwed onto a threaded stem on the upper end of the drawbar, or an Ott brand plug 131 can be screwed into the drawbar and secure the spring seat piston 127 to the drawbar. Thus, in the condition shown in FIG. 2 of the drawing, with no toolholder in place in the spindle, the drawbar return or retraction spring stack 124 pulls the cam plug 123 upward so that the conical surfaces 132 and 133 thereof engage the matching conical surfaces of the collet fingers 122, forcing them outward against the bore 134 of the spindle 19.

Operation of this drawbar is accomplished according to another feature of the present invention. It includes provision of a ram rod 141 (FIG. 2A) inside of and coaxial with the drive screw 61, the lower end of ram rod 141 being immediately above the drawbar top plug 131. The ram rod has a central lumen throughout its length. A three-stage pneumatic cylinder assembly 142 is fastened by four screws 143 to the top of the ball drive screw 61. This cylinder assembly includes a stack of three cylinders 144, 146 and 147. In each cylinder there is a piston such as 148 fastened by circularly spaced screws 149 to retainer plates 151 received in circumferential grooves 152 in the ram rod. Suitable shaft and peripheral seals are provided between tile chambers and the ram rod and the pistons and the cylinder walls. Inductive position sensors 154a and 154b are mounted by a suitable bracket to the cylinder head 156. A ram rod position indicating collar 157 is secured to the ram rod and associated with tile sensors to designate drawbar clamping and unclamping position attainment. Suitable pneumatic (typically air at 60–100 psi) supply is available to chambers 158, 159 and 161 above the pistons through control valves (not shown) appropriate for both supply and venting of these chambers when desired for respectively unclamping and clamping toolholders. The chambers below two of the pistons are always open to atmosphere. The chamber below the bottom piston is used to pneumatically (at a pressure of 60–100 psi during spindle rotation) hold the ram rod 141 above tile draw bar plug 131 to prevent contact during spindle rotation. Also the valve controlled air supply is provided through a connector 160 at the top of the ram rod to supply a chip removal air blast down through the lumen of ram rod 141, spindle plug 131 and drawbar lumen 121*a* and out the lower end 121*b* of the drawbar when it is driven down to unclamp the toolholder as will be described.

Figure 6:
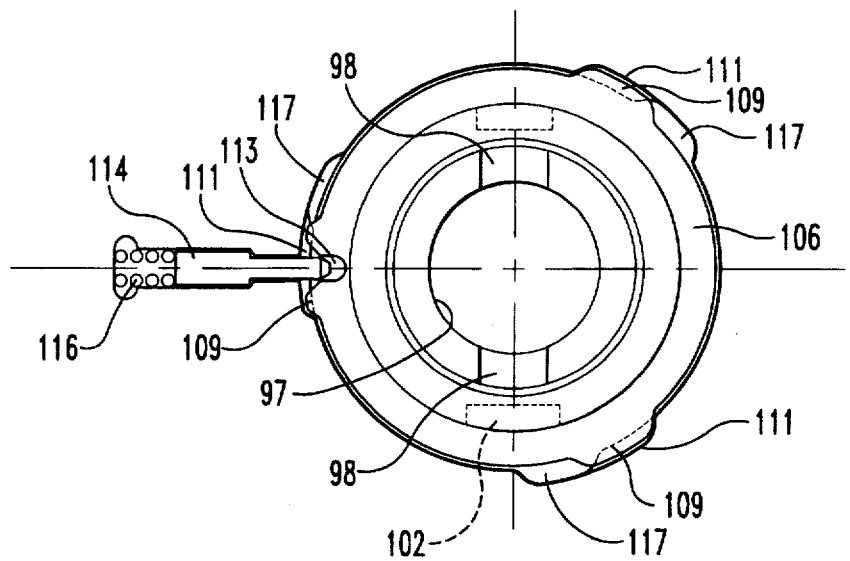
FIG. 6 is a section taken at line 6—6 in FIG. 5 and viewed in the direction of the arrows.
Figure 7:
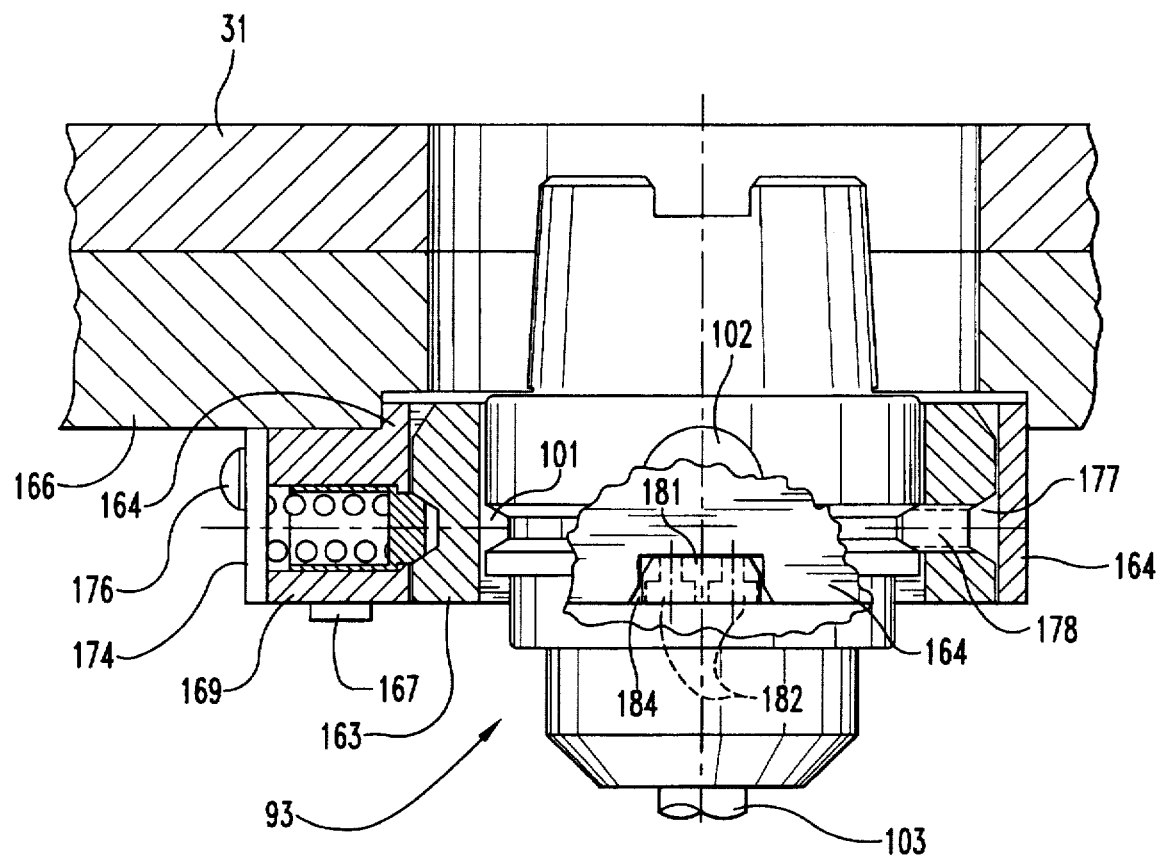
FIG. 7 is a section through an alternate embodiment of toolholder adaptor.
Figure 8:
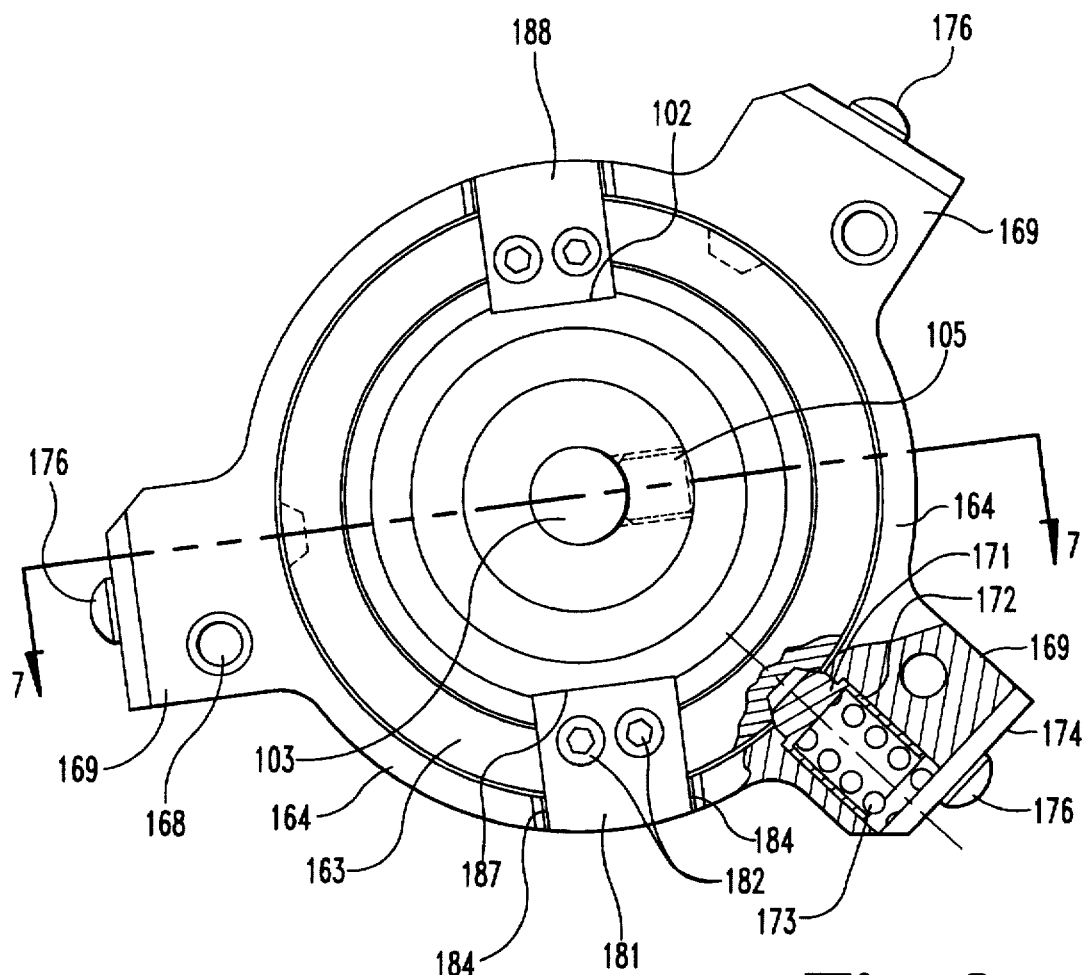
FIG. 8 is a bottom plan view thereof showing where
Figure 9:
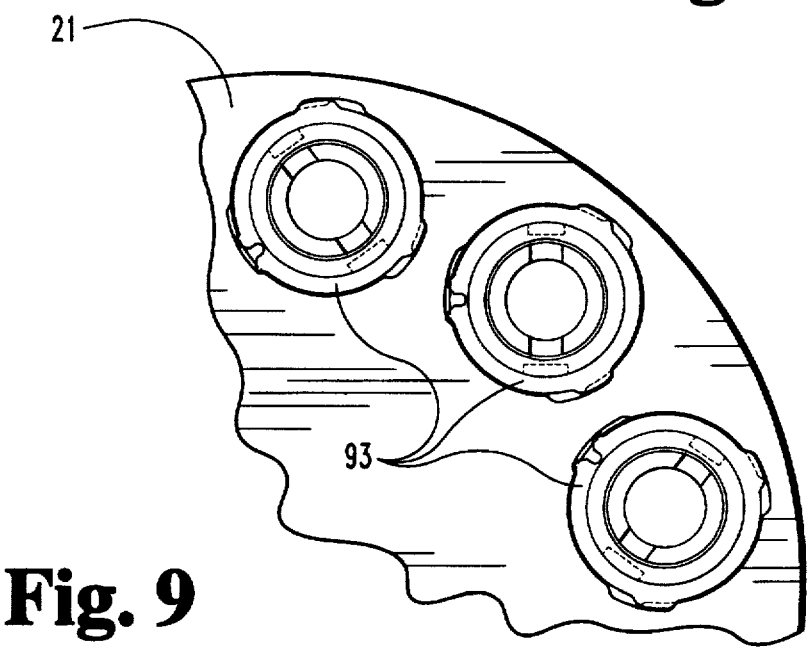
FIG. 9 is a top view of a fragment of a tool disk of FIGS. 1–6 showing several of the tool receivers with toolholders stored therein.

As discussed above, the adaptor-toolholder assembly shown in FIGS. 5 and 6 requires that the spindle be turned through a 16° arc to enable removal from the tool disk before it can be advanced downward to apply the cutter to the workpiece. Similarly, it requires a 16° turn after restoration in the tool disk in order to locate the lugs 109 on the shelves 111 in the tool disk and enable the detent pin 114 to be centered in the detent notch 113. Then the spindle must release the grippers, move up into storage position to clear the path for the tool disk to move the next toolholder designated for the next cut, into position under the spindle. In order to avoid the need for the 16° turn of the spindle for removal and return of the toolholder in the tool disk, the embodiment of FIGS. 7 and 8 is provided. In this case, the toolholder itself can be identical to that shown in the FIGS. 5 and 6 embodiment, so it is given the same reference numeral 93. An end milling cutter 103 is secured in the toolholder by a set screw 105 in conventional manner. But the toolholder adaptor 163 and its mounting to the tool disk are different. A tool disk retainer 164 is fastened to the bottom of tool disk 166 by three socket head cap screws 167, received in counter-bored holes 168 in each of the three pods 169 in the retainer 164. Each of the three pods 169 includes a detent pin 171 having a frustoconical inner end and a spring receiving cup 172 extending outwardly therefrom and receiving the coil spring 173, the outer end of which is abuttingly engaged with the spring retainer cover plate 174, secured to the pod by socket head cap screw 176.

The detent pins 171 are received in the circumferential groove 177 in the adaptor. Because they are spring loaded and the walls of the groove 177 are tapered as shown, the pins center in the groove and securely retain the adaptor in the retainer 164 when the toolholder is installed in the retainer. As described above with reference to FIGS. 5 and 6, the toolholder itself is retained in the adaptor by three circularly spaced set screws. In the FIGS. 7 and 8 version the set screws such as 178 are threaded into the adapter at the "bottom" of the groove 177, and the inner ends of the set screws are received in the groove 101 in the toolholder and secure it in the adaptor. In conventional manner, two different widths of key are used in the toolholder adaptor for consistent orientation with respect to the toolholder retainer. The wide key 181 is fastened to the bottom of the adaptor 163 by two socket head cap screws 182 with the outer end of key 181 received in notch 184 in the retainer 164, and the inner end 186 of the key received in the notched flat 187 of the toolholder. Similarly, the inner end of key 188 is received in the notch 102 in the wall of the toolholder. Note in the portion of FIG. 7, where the toolholder and adaptor are cut away entirely to show the inside wall of retainer 164 at the far side, the notch 184 therein which receives the key 181 has chamfered entrance edges. This is done at both notches as shown in FIG. 8, to facilitate entry and centering of the keys in the retainer when the toolholder with adaptor is returned to detented position in the retainer 164.

OPERATION

In the operation of the apparatus, when a particular tool is to be applied to the workpiece, the tool disk is rotated to place the appropriate toolholder in registry with the spindle axis. Pneumatic pressure, typically air, is applied above the pistons whereupon the ram rod drives the drawbar down against the load of the Belville springs so the conical cam surfaces will descend and enable the collet fingers to move inwardly so that the surfaces 136 thereof can pass the bore 97 of the in-turned flange of the shank portion of the toolholder so float the upper edges 137 of the fingers are below the tapered lower face 138 of the flange of the toolholder. Then, while the spindle remains in that position, pressure is released from the pistons, enabling the Belville spring stack to retract the drawbar whereupon the cam surfaces 132 and 133 of the cam plug force the fingers outward into engagement with the in-turned conical flange of the toolholder. Simultaneously the conical face of the toolholder engages the conical face of the spindle, and the lower end of the spindle engages the upper face of the flange of the toolholder to provide a tight concentric and axially immovable attachment of the toolholder with the spindle. Then the spindle is turned clockwise in the direction of the arrow in FIG. 6 through an angle of 16° to move the lugs 109 off the supporting shelves 111 and into registry with the slots 117 in the tool disk, following which the ball nut can drive the spindle downward to position the tool onto the workpiece and commence the machining operation. When the machining with this particular tool has been completed, the procedure is reversed. The toolholder is retracted into position in the tool disk; then turned 16° to shelve the lugs on shelves 111. The detent pin 114 enters notch 113 to maintain that stored position. The pneumatic cylinders are energized to unclamp the toolholder. The spindle is retracted and the tool disk is advanced to place another toolholder in position for clamping. Alternatively, operations may be terminated by releasing pressure from the pneumatic cylinders whereupon the clamping mechanism is retracted to the original position shown in FIGS. 2B and 3B.

The operation of the embodiment of FIGS. 7 and 8 is similar to that described above. But in this example, there is no need to turn the adaptor 163 in the retainer 164 in order to move the adaptor and toolholder therewith out of the tool disk. The chamfered walls of groove 177 in the adaptor, and the frustoconical inner ends of the detent pins 171 in the retainer, enable the downward force of the spindle to push the toolholder with adaptor down and out of the retainer toward the workpiece. Following the cutting operation on the workpiece by this particular tool, the spindle retracts and stops upon entry of the detent pins 171 into the groove 177 whereupon the spindle unclamps from the toolholder, following which the spindle retracts further into rest position, permitting the tool disk to move the next toolholder into position for engagement by the spindle.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In a machine having a frame and a spindle for driving a tool in rotation, the improvement comprising:

an elongate drive sleeve having a longitudinal axis and rotatably mounted in the frame to rotate about its axis;

a spindle received in the sleeve and coupled to the sleeve to rotate with the sleeve when the sleeve is rotated, the spindle being axially movable in the sleeve relative to the sleeve;

a first spindle drive motor coupled to the sleeve to drive the sleeve and, thereby, the spindle, in rotation;

a screw coupled to one end of the spindle to drive the spindle axially, the screw having a rotation limiting device thereon;

a nut rotatably mounted to the frame to rotate about the axis and engaged with the screw to axially advance and retract the screw and thereby, the spindle, in response to rotation of the nut in one and the opposite rotational direction about the axis;

a second motor coupled to the nut to rotate the nut for axial drive of the spindle;

a toolholder gripping system extending inside the spindle and including a toolholder gripper;

a gripping system operator shaft extending inside the drive screw and engageable with the gripping system; and a shaft operator device including a first portion coupled to the drive screw for linear movement with the drive screw, the operator device including a second portion operable by the operator device to move the operator shaft axially relative to the drive screw to move a portion of the gripping system axially relative to the spindle for releasing a toolholder.

2. The improvement of claim 1 and wherein:

the sleeve is axially confined in the frame to prevent axial movement of the sleeve in the frame.

3. The improvement of claim 2 and further comprising:

first and second axially spaced bearings mounted in the frame and both radially and axially locating the sleeve in the frame and preventing axial movement of the sleeve in the frame.

4. The improvement of claim 2 and wherein:

the spindle is fittingly received in the sleeve and is slidable longitudinally in the sleeve as the spindle is driven in rotation about the axis.

5. The improvement of claim 1 and further comprising:

a tool storage device coupled to the frame; and a plurality of toolholders stored in the storage device and positionable by the storage device, one at a time, in alignment with the toolholder gripping system to enable the gripping system, during a pause following axial movement advancing the spindle by driving the nut in one rotational direction, to connect to a toolholder and then, upon resumption of axial movement advancing the spindle, drive the toolholder out of the storage device and cause a tool in the toolholder to engage and operate on a workpiece and, by driving the nut in the opposite rotational direction, to retract the toolholder into the storage device and then disconnect the coupling system from the toolholder.

6. The improvement of claim 1 and further comprising:

a tool storage device having a plurality of toolholder receiver openings therein and movable to position the receiver openings, one-at-a-time, in registry with the toolholder gripper to enable the gripper to grip the toolholder situated in a receiver opening.

7. The improvement of claim 6 and wherein the storage device has circularly-spaced shelves at each of said openings, the improvement further comprising:

toolholder adaptors secured to the toolholders, each adaptor having circularly-spaced lugs thereon matching the spacing of the shelves and normally retaining the adaptors and thereby, the toolholders, in the storage device, each receiver opening having entry slots adjacent the shelves to admit the lugs to position in the storage device adjacent the shelves whereby the shelves are accessible to the lugs;

detent pins, one detent pin being located at each receiver opening; and a detent notch in each adaptor and engageable by the detent pin when the adaptor is in the receiver opening and the lugs on the adaptor are oriented in registry with the shelves whereby the adaptors are retained in the storage device.

8. The improvement of claim 7 and wherein:

the detent notch is in one of the lugs of each adaptor; and the detent pins reside in the storage device and are spring loaded.

9. The improvement of claim 8 and wherein:

the storage device is a tool disk mounted to the frame and rotatable about a second axis parallel to the drive sleeve axis; and the toolholder receiver openings are circularly spaced around the second axis.

10. The improvement of claim 9 and wherein:

the axes are vertical.

11. In a machine having a frame and a spindle for driving a tool in rotation, the improvement comprising:

a first spindle drive motor mounted to the frame and coupled to the spindle to drive the spindle in rotation about a first axis;

a screw coupled to one end of the spindle to drive the spindle axially, the screw having rotation limiting means thereon;

a nut rotatably mounted to the frame to rotate about the axis and engaged with the screw to axially advance and retract the screw and thereby, the spindle, in response to rotation of the nut in one and the opposite rotational direction about the axis;

a second motor coupled to the nut to rotate the nut for axial drive of the spindle;

a toolholder gripping system extending inside the spindle and including a toolholder gripper;

a gripping system operator shaft extending inside the drive screw and engageable with the gripping system; and a shaft operator device including a first portion coupled to the drive screw for linear movement with the drive screw, the operator device including a second portion operable the operator device to move the operator shaft axially relative to the drive screw to move a portion of the gripping system axially relative to the spindle for releasing a toolholder.

12. The improvement of claim 11 and wherein:

the nut is a ball nut and the screw is a ball screw.

13. The improvement of claim 11 and further comprising:

a tool storage device having a plurality of toolholder receiver openings therein and movable to position the receiver openings, one-at-a-time, in registry with the toolholder gripper to enable the gripper to grip a toolholder situated in a receiver opening, the storage device having toolholder retainers at the receiver openings.

14. The improvement of claim 13 and wherein the retainers include circularly-spaced shelves at each of said openings, the improvement further comprising:

toolholder adaptors securable to the toolholders to hold the toolholders, each adaptor having circularly-spaced lugs thereon matching the spacing of the shelves and normally retaining the adaptors and thereby, the toolholders, in the storage device, each receiver opening having entry slots adjacent the shelves to admit the lugs to position in the storage device adjacent the shelves whereby the shelves are accessible to the lugs;

detent pins, one detent pin being located at each receiver opening; and a detent notch in each adaptor and engageable by the detent pin when the adaptor is ill the receiver opening and the lugs on the adaptor are oriented in registry with the shelves whereby the adaptors are retained in the storage device.

15. The improvement of claim 14 and wherein:

the detent notch is in one of the lugs of each adaptor; and the detent pins reside in the storage device and are spring loaded.

16. The improvement of claim 15 and wherein:

the storage device is a tool disk mounted to the frame and rotatable about a second axis parallel to the spindle axis; and the toolholder receiver openings are circularly spaced around the second axis.

17. The improvement of claim 16 and wherein: the axes are vertical.

18. The improvement of claim 16 and wherein the machine spindle is vertical, and further comprising:

tools in the toolholders;

a workpiece holder mounted to the frame under the spindle and movable in translation in a horizontal plane to move a workpiece into various positions under the spindle for treatment by various ones of the tools, one-at-a-time.

19. The improvement of claim 13 and further comprising:

a first set of detent devices, each retainer including one detent device of the first set.

20. The improvement of claim 19 and further comprising:

toolholder adaptors, each adaptor having means thereon for attachment to a toolholder;

a second set of detent devices, one detent device of the second set being located in each of the adaptors and cooperable with a detent device of the first set to retain the adaptor in the storage device.

21. The improvement of claim 20 and wherein:

the detent devices of the first set are spring loaded pins, and the detent devices of the second set are pin receivers in the adaptor.

22. The improvement of claim 21 and wherein:

each adaptor has a circumferential groove which is the detent pin receiver for the adaptor.

23. The improvement of claim 21 and wherein:

the storage device is a tool disk mounted to the frame and rotatable about a second axis parallel to the spindle axis;

the toolholder receiver openings are circularly spaced around the second axis; and the toolholder retainers include bodies fastened to the tool disk, one of said bodies at each receiver opening, each body having three circularly spaced pods thereon, with one of the detent pins contained in each of the pods and projecting radially inward from the retainer into the pin receiver in the adaptor at the opening.

24. The improvement of claim 23 and wherein:

the axes are vertical, and the detent pins are sufficiently seated in the receivers and loaded by the springs to prevent the adaptors from falling from the tool disk, but downward drive of the spindle by the second motor is forceful enough to push the pins against the resistance of the spring loading and out of the recesses to remove a toolholder from the tool disk and advance the toolholder toward a workpiece.

25. The improvement of claim 11 and wherein:

the gripping system operator shaft has a fluid conveyor lumen extending longitudinally therein.

26. The improvement of claim 25 and wherein:

the gripping system includes a drawbar having a fluid conveyor passageway extending longitudinally therein.

27. The improvement of claim 26 and wherein:

the drawbar has one end proximate one end of the drive screw;

the fluid conveyor passageway has an inlet at the one end;

the fluid conveyor lumen has a fluid exit at the lower end communicable with the inlet in the drawbar when the operator shaft is moved axially relative to the drive screw to convey fluid from the operator shaft through the drawbar.

28. The improvement of claim 27 and wherein:

the operator device is mounted to the top of the drive screw; and an air pressure connector is fastened to the operator shaft above the operator device and communicates with the lumen in the operator shaft to supply air down through the operator shaft and through the drawbar.

29. A method of moving a workpiece treating tool mounted in a toolholder gripped in the spindle of a machining center which has a tool storage magazine with a plurality of toolholders therein, the machining center having a workpiece holder position, the method comprising the steps of:

linearly driving a non-rotating screw and thereby sliding the spindle longitudinally in a direction retracting the tool away from the workpiece holder position until the toolholder partially extends through a receiver in the tool storage magazine;

pressurizing an actuator device associated with the non-rotating screw and the spindle to release the grip on the toolholder; and further retracting the spindle into a rest position enabling the storage magazine to move a different tool holder into position of registry with the spindle.

30. The method of claim 29 and further comprising the step of:

fixing the toolholder in a toolholder adaptor;

causing a detent device on the storage magazine to cooperate with a detent device oil the adaptor to retain the adaptor in the magazine;

terminating the gripping of the toolholder on the spindle; and causing the cooperating detent devices to retain the adaptor in the magazine during the further sliding of the spindle in the retracting direction.

31. The method of claim 30 and further comprising the steps of:

before causing the cooperation of the detent devices, turning the spindle and thereby the toolholder through an angle less than 30 degrees to place the toolholder in a storage position in the magazine;

after causing the cooperation, then terminating the gripping of the toolholder on the spindle;

reverse turning the spindle through the angle; and then further sliding the spindle in the retracting direction.

32. The method of claim 31 and wherein:

the step of turning the spindle includes turning a sleeve engaging the spindle to turn the spindle; the method further comprising the step of:

preventing axial movement of the sleeve during the step of sliding the spindle in the retracting direction.

33. The method of claim 30 and wherein the step of terminating the gripping includes:

pushing a gripper operating cam in a direction toward the workpiece holder position.

34. The method of claim 33 and wherein the pushing step includes:

causing the actuator device widen pressurized to drive a shaft inside the spindle toward the workpiece holder position.

35. The method of claim 34 and wherein:

the step of sliding the spindle includes rotating a ball nut on a non-rotating ball screw; and the step of terminating the gripping includes operating the actuator device to push a shaft inside the ball screw in a direction toward the workpiece holder position.

36. The method of claim 35 and wherein:

the actuator operating step includes pressurizing a cylinder atop the drive screw.

* * * * *

UNITED STATES PATENT AND TRADEMARK OFFICE
CERTIFICATE OF CORRECTION

PATENT NO. : 5,613,929　　　　　　　　　　　　　　　Page 1 of 2
DATED : March 25, 1997
INVENTOR(S) : Jack L. Bayer It is certified that error appears in the above-indentified patent and that said Letters Patent is hereby corrected as shown below:

Title page, in the ABSTRACT, after the last word "toolholder.", add the following:
--In one version, a small angle turn of the spindle clockwise frees toolholder adaptor lugs from retaining shelves in the index disk and enables further axial advance of the spindle by rotation of the ball nut to move the tool to the workpiece. Rotation of the ball nut in the opposite direction retracts the toolholder into the index disk, and a small angle turn of the spindle counterclockwise shelves the retaining lugs in the index disk. Energizing the actuator releases the grippers, enabling retraction of the spindle from the toolholder upon further rotation of the ball nut in the opposite direction. In another version the toolholder adaptor is different, being retained in the index disk by a set of spring loaded detent pins, so it can be pushed straight out of the disk without turning the spindle.--

Column 1, lines 16, 17, 35, 44, change "tile" to --the--.
Column 1, line 35, delete "U.S.".
Column 2, lines 31, 65, change "tile" to --the--.
Column 2, line 63, add --toolholder gripper.--.
Column 4, line 63, after the second occurrence of the word "screw" insert --is--.

UNITED STATES PATENT AND TRADEMARK OFFICE
CERTIFICATE OF CORRECTION

PATENT NO. : 5,613,929
DATED : March 25, 1997
INVENTOR(S) : Jack L. Bayer

It is certified that error appears in the above-indentified patent and that said Letters Patent is hereby corrected as shown below:

```
Column 5, line 31, change "Lo" to --to--.
Column 6, lines 28, 51, 56, 66, change "tile" to --the--.
Column 6, line 22, change "121 a" to --121a--.
Column 8, line 6, change "float" to --that--.
Column 10, line 47, after the word "operable" insert --by--.
Column 11, line 10, change "ill" to --in--.
Column 11, line 25, after "wherein:" insert a return to begin a new line
   with the words "the axes".
Column 12, line 48, change "tool holder" to --toolholder--.
Column 14, line 3, change "widen" to --when--.
```

Signed and Sealed this

Ninth Day of September, 1997

Attest:

BRUCE LEHMAN

Attesting Officer  Commissioner of Patents and Trademarks